United States Patent [19]

Rosplock et al.

[11] Patent Number: 5,896,222
[45] Date of Patent: Apr. 20, 1999

[54] FUSED SILICA LENS, MICROLITHOGRAPHY SYSTEM INCLUDING A FUSED SILICA LENS AND METHOD OF MAKING A FUSED SILICA LENS

[75] Inventors: Cynthia K. Rosplock; Daniel R. Sempolinski, both of Painted Post, N.Y.

[73] Assignee: Corning Incorporated, Corning, N.Y.

[21] Appl. No.: 08/985,552

[22] Filed: Dec. 5, 1997

Related U.S. Application Data

[63] Continuation-in-part of application No. 08/575,810, Dec. 22, 1995, abandoned.

[51] Int. Cl.[6] .................... G02B 13/14; C03C 3/06; C03C 4/00; C03B 19/09
[52] U.S. Cl. .................... 359/355; 501/905; 501/54; 65/17.4
[58] Field of Search ................... 359/355, 350; 501/905, 54, 53; 65/17.4

[56] References Cited

U.S. PATENT DOCUMENTS

| 5,043,002 | 8/1991 | Dobbins et al. | 65/386 |
| 5,616,159 | 4/1997 | Araujo et al. | 65/17.4 |

OTHER PUBLICATIONS

Publication by D. Krajnovich, I.K. Our, A.C. Tam, W. Lueng and M. Kulkarmi, "Sudden Onset of Strong Absorbtion Followed by Recovery of KrF Irraddiated Fused Silica", Optics Letters, vol. 18, No. 6, pp. 453–455, Mar. 15, 1993.

*Primary Examiner*—Jon Henry
*Attorney, Agent, or Firm*—Milton M. Peterson

[57] ABSTRACT

A method of producing a fused silica glass by thermally converting a polymethylsiloxane precursor, the lens transmitting ultraviolet radiation at wavelengths below 300 nm, without undergoing a marked absorption transition, the lens so produced, and a microlithography system employing a lens of such glass.

11 Claims, 1 Drawing Sheet

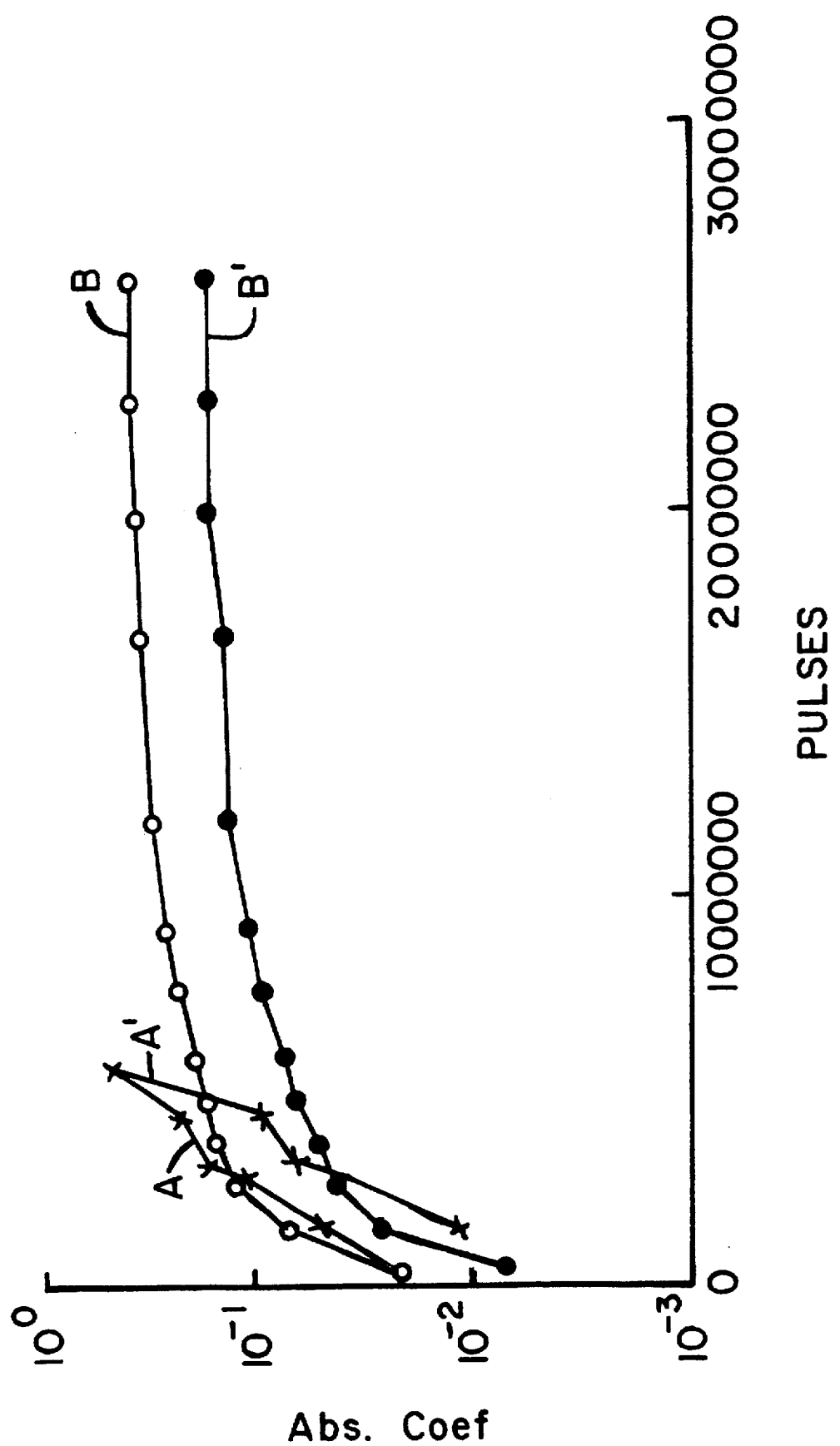

FUSED SILICA LENS, MICROLITHOGRAPHY SYSTEM INCLUDING A FUSED SILICA LENS AND METHOD OF MAKING A FUSED SILICA LENS

This application is a continuation-in-part of Ser. No. 08/575,810, filed Dec. 22, 1995 now abandoned.

FIELD OF THE INVENTION

Production of fused silica lenses that transmit ultraviolet (UV) radiation with controlled optical damage, and their use in microlithography systems.

BACKGROUND OF THE INVENTION

The ability of fused silica to transmit ultraviolet (UV) radiation has caused this synthetic material to receive increasing attention recently. Fused silica lenses have found a variety of uses in applications requiring transmission of UV radiation at wavelengths below 300 nm. and with an intensity of 100 mJ/cm$^2$/pulse or greater.

One such application of particular interest is microlithography systems. These systems are used in the production of integrated circuits where the move is toward ever smaller sizes. This move is expected to require microlithographic systems employing pulsed, KrF excimer lasers emitting 248 nm. radiation. Such systems require 20–30 fused silica lenses commonly referred to as stepper and scanner lenses.

Earlier studies showed that synthetic fused silica, when exposed to prolonged 248 nm. radiation, underwent increased UV absorption damage, increased red (650 nm.) fluorescence and compaction (densification) of the glass. The absorption damage is observed as absorption bands centered at 215 and 260 nms. The 215 nm. band is prevalent in all fused silicas. The tails of these bands tend to create a significant absorption of the 248 nm. wavelength radiation from a KrF laser, or of the 193 nm. wavelength radiation from an ArF laser.

At low exposures, the 215 nm. absorption and the compaction increase with the number of pulses and with laser intensity. The 215 nm. absorption relaxes partially when exposure is interrupted, but returns with renewed exposure. At higher exposure levels, the 215 nm. absorption increases rapidly and becomes permanent, that is, it does not relax when exposure stops. This transition is accompanied by a marked increase in absorption at 260 nm., in the red fluorescence, and in sample temperatures.

The transition has been termed "sudden absorption transition (SAT)" in a publication by D. Krajnovich, I. K. Pour, A. C. Tam, W. Lueng and M. Kulkarmi entitled "Sudden Onset of Strong Absorption Followed by Forced Recovery in KrF Irradiated Fused Silica", OPTICS LETTERS, Vol. 18, No. 6, pp. 453–455, Mar. 15, 1993.

It is a purpose of the present invention to provide a method of producing a fused silica lens that transmits ultraviolet radiation at wavelengths below 300 nm. without undergoing a marked absorption transition or an increased red fluorescence, and that does not require forced cooling of the lens.

It is another purpose to provide a method of producing a fused silica lens that incurs controlled optical damage when transmitting ultraviolet radiation at wavelengths below 300 nm., whereby the absorption transition effect is not encountered and the damage stabilizes without further increase at a certain level.

It is a further purpose to provide a method of producing improved fused silica lenses for use in transmitting radiation from a KrF or a ArF laser.

It is another purpose to provide a method of producing improved fused silica, stepper and scanner lenses for use in a microlithography system.

It is a still further purpose to provide a method of producing a fused silica that transmits in excess of ten million pulses of radiation having a wavelength below 300 nm. and an intensity of at least 100 mJ/cm$^2$/pulse without undergoing a marked absorption transition.

It is also a purpose to provide improved, fused silica lenses produced by the improved method.

SUMMARY OF THE INVENTION

The invention resides in a method of producing a fused silica lens that transmits ultraviolet radiation having a wavelength below 300 nm. with controlled optical damage and inhibited red fluorescence during such transmission, the method comprising thermally converting a polymethylsiloxane precursor to fused silica particles, consolidating the particles into a body, and forming an optical lens from the fused silica body that transmits ultraviolet radiation below 300 nm. wavelength while incurring optical damage up to a certain level when transmitting such radiation, that does not incur a marked absorption transition at any level, that becomes saturated and incurs essentially no further damage and in which the red fluorescence diminishes while further transmitting radiation.

The invention further resides in a method of producing a fused silica lens that transmits ultraviolet radiation having a wavelength below 300 nm. without incurring a marked absorption transition or an increased red fluorescence, the method comprising (a) producing a gas stream containing a polymethylsiloxane as a fused silica precursor, (b) transporting the stream containing the precursor to a combustion burner, (c) converting the precursor by thermal decomposition with oxidation or hydrolysis in a slightly reducing atmosphere to form fused silica particles, (d) depositing the fused silica particles, (e) consolidating the particles into a transparent body of fused silica, and (f) forming an optical lens from such body of fused silica.

The invention further resides in the fused silica lens produced by such methods, and the use of such lens in a photolithography system.

BRIEF DESCRIPTION OF THE DRAWINGS

The single FIGURE in the accompanying drawing is a graphical representation illustrating an advantage ensuing from the present invention.

DESCRIPTION OF THE INVENTION

The present invention arose from studies designed to determine the optical behavior of fused silica lenses under varying conditions.

Various processes are known in the art for the production of fused silica from vaporous reactants. The basic requirements are providing a feedstock solution, generating vapors (the reactants) from the feedstock solution, transporting the vapors to a reaction site, and converting the feedstock vapors to fused silica particles by thermal decomposition with oxidation or flame hydrolysis. The product is finally divided, spherical aggregates commonly referred to as silica soot. This soot may be deposited directly in the form of a boule, or may be deposited as particles that may be thermally consolidated. In either case, a transparent, non-porous, silica glass article of high purity is produced.

For various reasons, silicon tetrachloride ($SiCl_4$) became the standard feedstock for production of either silica soot or solid bodies of fused silica. $SiCl_4$ has a serious draw back in that the by-product of hydrolysis is HCl. The environmental unfriendliness of this material necessitates considerable care in its disposal. Also, impurities in the chloride result in particulate impurities in the ultimate product. Nevertheless, $SiCl_4$ has remained in use for over a half century and has been available from Corning Incorporated under Code 7940.

In recent years, enhanced sensitivity to protection of the environment, as well as strict government regulations regarding permissible emissions into the air, have developed. This has led to a search for a halide-free feedstock more friendly to the environment. The search culminated in the discovery that certain siloxane-based organics could replace $SiCl_4$ as a precursor for production of silica particles without substantial change in the method of production.

Based on that discovery, fused silica articles are now produced by Corning Incorporated using octamethylcyclotetrasiloxane (OMCTS) as a chemical precursor. This fused silica material is available under Code 7980. Its production is described in U.S. Pat. No. 5,043,002 (Dobbins et al.) and the teachings of that patent are incorporated herein in their entirety.

Briefly, the procedure characteristically involves using a polymethylsiloxane, in particular octamethylcyclosiloxane, as a silica precursor. Otherwise, the steps are generally as in the use of $SiCl_4$. A gas is bubbled through the siloxane to entrain vapors which are transported to a combustion burner. There, the siloxane precursor is converted by thermal decomposition, either with oxidation or by hydrolysis in a slightly reducing atmosphere, to fused silica particles. The particles are deposited or collected, and consolidated to form a transparent body of fused silica. The body, usually larger than a lens blank, is sliced to form appropriate sized blanks which are surface-finished to provide lenses.

Fused silica-type materials have become well known through their use in the production of large telescope mirrors. Recently, however, considerable interest has developed in producing optical elements, such as lenses, from such materials. In particular, there is a desire to produce stepper and scanner lenses from such materials for use with an excimer laser in microlithographic systems. A key requirement for such use is the capability of transmitting very short wavelength radiation in the UV region, in particular radiation at 193 and 248 nm wavelengths. It is anticipated that a pulsed excimer laser will be the illumination source for future microlithography systems. These lasers generate radiation in the short UV region, in particular at 193 and 248 nm wavelengths.

Attempts were made to use the traditional Code 7940 fused silica glass for optical lenses designed to transmit very short ultraviolet radiation. This work revealed that the glass exhibits compaction, UV absorption and a red fluorescence when exposed to intense UV radiation for a prolonged period of time. Further, these characteristics continue to increase as the period of exposure increases.

Of particular concern is the fact that, as the damage due to UV absorption accumulates, a point is reached at which the absorption damage undergoes a marked increase described by Krajnovich et al. as "sudden absorption transition (SAT)." At this point, it no longer relaxes when exposure is discontinued.

The transition effect usually occurs in Code 7940 glass after exposure to 6–10 million pulses with a beam of 350–400 $mJ/cm^2$/pulse intensity. The transition point will normally occur after fewer pulses with a beam of higher intensity. Conversely, it will normally occur only after more pulses with a beam of lower intensity, say 250 $mJ/cm^2$/pulse. This condition is deleterious to lens use because it leads to sharp temperature rises in the glass under exposure, as well as diminished transmission. The sharp temperature rise has led to a need for forced cooling of the lens.

The UV absorption is ascribed to a structural defect termed an E' center. This structural defect results from a paramagnetic electron trapped in a dangling silicon orbital projecting into interstitial space. The E' center is detected by electron spin resonance spectroscopy since it has an unpaired electron. The induced E' center has a 5.8 eV (210 nm) absorption band. The adsorption at 210 nm is particularly deleterious in applications employing an ArF laser generating radiation at 193 nm. The absorption band tends to tail into the irradiating wavelength region of this laser.

The E' center defect has been found to occur in all types of fused silica examined. It increases with beam intensity and with the number of radiation pulses from a laser. The absorption effect will relax in part over a period of several minutes after removal from the irradiation of a laser beam. However, upon re-exposure to a laser beam, the absorption quickly recovers to its prior level. It then continues its normal rate of increase.

Initially, it was observed that the two types of fused silica glass, Codes 7940 and 7980, behave in a very similar manner. Thus, they both exhibit compaction, and they both undergo increasing UV absorption. They differ in that the induced red fluorescence increases with increasing length of exposure to ultraviolet radiation in Code 7940 glass, but decreases in the Code 7980 glass.

At the point where the Code 7940 glass reaches a certain level, their absorption behavior diverges markedly. The compaction continues with further exposure in both types of glass. However, the Code 7980 glass does not undergo the marked increase in UV absorption characteristic of the Code 7940 glass. Rather, in the Code 7980 glass, absorption slows, becomes saturated and moves toward a constant level. This means that a fused silica glass article can be produced that is not subject to the absorption transition effect that characterizes the Code 7940 type glass. Further, this can be accomplished without resort to any auxiliary treatment, such as a hydrogen anneal, or forced cooling of the glass. The key is to employ a polymethylsiloxane precursor in producing the fused silica article.

The difference in behavior is illustrated graphically in the single FIGURE of the attached drawing. Intensity of radiation is plotted on the horizontal axis in terms of millions of laser pulses. The change in absolute coefficient (Abs. Coeff.) is measured at 210 nm in absorbance units per centimeter. It is plotted on the vertical axis. Measurements were made on fused silica test pieces exposed to a pulsed KrF laser delivering a radiation beam of 350 $mJ/cm^2$/pulse intensity at the 248 nm wavelength.

The change in the UV transmission was measured both on-line and off-line for both Code 7940 and Code 7980 glasses. Because the absorption damage tends to relax out at room temperature, the off-line measurements were made within 5 minutes after the sample was removed from the beam. The measurements were normally made at intervals of 2 million pulses. As indicated in the drawing, measurements were made on Code 7980 glass to a point beyond 25 million pulses where behavior had reached a plateau.

The transmission measurement consisted of two scans from 200 to 400 nm. The first was made within the damaged zone centered at the point of maximum beam intensity. The second was a reference scan made in an undamaged area. The measurements were made parallel to the path of the laser beam. A machine baseline was run just before each pair of spectral scans. The data were reported as the difference between the absorption coefficients of the two scans. The individual coefficients were calculated by first adjusting the data to its theoretical value at 400 nm (92.9%) and then using the equation:

$$T(\%)=100(1-R)^2 e^{-at}$$

where a is the absorption coefficient, t is the sample thickness and R is the theoretical reflection coefficient.

Curves A and A' are based, respectively, on data obtained from on-line and offline measurements made on a Code 7940 glass test piece; curves B and B' are likewise based on data obtained from measurements on a Code 7980 glass test piece. It will be observed that the behavior of the two test pieces is essentially identical up to a point between six and 12 million, the lower number being more typical. At that point, the absorption of the 7940 glass, curve A, rises sharply. In contrast, the absorption of the Code 7980 glass (curve B) continues on a smooth curve that levels off in a horizontal direction. In rising sharply, the absorption value shown by curve A undergoes the characteristic absorption transition. In contrast, absorption curve B for the Code 7980 glass test piece levels off and does not undergo the transition. This difference in absorption behavior, as well as fluorescences of the two types of fused silica glass is surprising and completely unexpected.

The present glasses may be distinguished from the hydrogen annealed glasses disclosed in U.S. Pat. No. 5,616,159 (Araujo et al.). That patent describes a fused silica article resistant to damage caused by exposure to UV radiation at wavelengths below 300 nm. The glass has a hydroxyl ion content no greater than 50 ppm. It also has a hydrogen content that is greater than $10^{18}$ molecules/cm$^3$, and that may range up to greater than $10^{20}$ molecules/cm$^3$ of glass. The method described for producing the glass is characterized by doping the glass with molecular hydrogen by subjecting it to an anneal in a hydrogen-containing atmosphere The present glasses will contain less than $10^{18}$ molecules of H$_2$/cm$^3$ of glass, the usual content being on the order of 3–4×$10^{17}$ molecules/cm$^3$ of glass. They are of particular value where a limited degree of optical damage can be tolerated. In the interest of safety and expense, it is, or course, desirable to avoid working with hydrogen.

We claim:

1. A method of producing a fused silica lens that transmits ultraviolet radiation having a wavelength below 300 nm. with controlled optical damage and inhibited red fluorescence during such transmission, the method comprising thermally converting a polymethylsiloxane precursor to fused silica particles, consolidating the particles into a body, and forming from the fused silica body an optical lens that transmits ultraviolet radiation, that incurs optical damage up to a certain level when transmitting radiation below a wavelength of 300 nm., that does not incur an absorption transition at any level, that becomes saturated and incurs essentially no significant further damage, and in which the red fluorescence diminishes while further transmitting such radiation.

2. A method in accordance with claim 1 which comprises thermally converting octamethylcyclotetrasiloxane to fused silica particles.

3. A method in accordance with claim 1 which comprises forming from the fused silica body an optical lens that transmits ultraviolet radiation from a KrF laser emitting at about 248 nm.

4. A method in accordance with claim 1 which comprises forming from the fused silica body an optical lens that transmits over ten million pulses of radiation equivalent to that emitted from a pulsed excimer laser operating an intensity at 350–400 mJ/cm$^2$/pulse without undergoing an absorption transition.

5. A method in accordance with claim 1 which comprises producing the fused silica lens by (a) producing a gas stream containing a polymethylsiloxane as a fused silica precursor, (b) transporting the stream containing the precursor to a combustion burner, (c) converting the precursor to fused silica by thermal decomposition with oxidation or hydrolysis in a slightly reducing atmosphere, (d) depositing the fused silica particles onto a support, (e) consolidating the particles into a transparent body, and (f) forming from such body an optical lens that incurs a limited amount of damage from transmitting ultraviolet radiation having a wavelength below 300 nm., the amount of damage not increasing essentially after the damage reaches a saturation level.

6. A microlithography system comprising a pulsed excimer laser that emits radiation at a wavelength below 300 nm. and at least one fused silica lens that transmits the emitted radiation, the fused silica lens incurring optical damage due to such transmission, the optical damage increasing to a saturated condition without undergoing a marked absorption transition and the lens undergoing essentially no additional damage from further radiation transmission, the fused silica lens being composed of consolidated fused silica particles formed by thermally converting a polymethylsiloxane precursor to silica.

7. A microlithography system in accordance with claim 6 comprising a KrF laser that emits radiation at 248 nm.

8. A fused silica glass lens that transmits ultraviolet radiation having a wavelength below 300 nm., that exhibits a red fluorescence that diminishes in intensity as the transmission increases, that incurs optical damage that increases to a certain level as the transmission increases, but that undergoes essentially no substantial increase in optical damage with further transmission, that does not undergo an absorption transition at any level of radiation transmission at a wavelength below 300 nm., and that is a transparent body of consolidated fused silica particles thermally converted from a polymethylsiloxane precursor.

9. A fused silica glass lens in accordance with claim 8 wherein the fused silica has a hydrogen content below $10^{18}$ molecules per cm$^3$ of glass.

10. A fused silica glass lens in accordance with claim 8 wherein the precursor is octamethylcyclotetrasiloxane.

11. A fused silica glass lens in accordance with claim 8 that transmits radiation equivalent to over ten million pulses of radiation from a pulsed excimer laser at 350–400 mJ/cm$^2$/pulse without undergoing a marked absorption transition.

* * * * *